US011014690B2

(12) United States Patent
Davis et al.

(10) Patent No.: US 11,014,690 B2
(45) Date of Patent: May 25, 2021

(54) ADJUSTABLE INTERIOR MOCKUP

(71) Applicant: Textron Aviation Inc., Wichita, KS (US)

(72) Inventors: David Wayne Davis, Wichita, KS (US); Todd Alan Thisius, Cheney, KS (US); Chris Trask, Wichita, KS (US); Chris Pinkerton, Derby, KS (US); Alec Charles Willford, Wichita, KS (US)

(73) Assignee: Textron Innovations, Inc., Providence, RI (US)

( * ) Notice: Subject to any disclaimer, the term of this patent is extended or adjusted under 35 U.S.C. 154(b) by 204 days.

(21) Appl. No.: 16/048,947

(22) Filed: Jul. 30, 2018

(65) Prior Publication Data
US 2018/0334266 A1 Nov. 22, 2018

Related U.S. Application Data

(63) Continuation-in-part of application No. 14/510,020, filed on Oct. 8, 2014, now Pat. No. 10,894,616.

(51) Int. Cl.
*B64F 5/00* (2017.01)
*G09B 25/02* (2006.01)
*B64F 5/10* (2017.01)

(52) U.S. Cl.
CPC .............. *B64F 5/00* (2013.01); *B64F 5/10* (2017.01); *G09B 25/02* (2013.01)

(58) Field of Classification Search
CPC ........... B64F 5/00; B64F 5/0009; G09B 25/00
See application file for complete search history.

(56) References Cited

U.S. PATENT DOCUMENTS

| | | | |
|---|---|---|---|
| 2,332,625 A * | 10/1943 | Harold | B64F 5/10 52/654.1 |
| 6,941,189 B2 * | 9/2005 | Linn | G05B 19/41805 700/193 |
| 7,270,297 B2 | 9/2007 | Schafer et al. | |
| 7,754,819 B2 * | 7/2010 | Chino | C08F 8/14 525/326.1 |
| 2005/0236026 A1 | 10/2005 | Anticoli et al. | |
| 2010/0148002 A1 | 6/2010 | Park et al. | |
| 2012/0040159 A1 | 2/2012 | Pechnik | |
| 2013/0206710 A1 * | 8/2013 | Roschat | B64F 5/00 211/13.1 |

(Continued)

*Primary Examiner* — James B Hull
*Assistant Examiner* — Jennifer L Korb
(74) *Attorney, Agent, or Firm* — Erise IP, P.A.

(57) ABSTRACT

A system and method for simulating a structure is disclosed. An adjustable interior mockup for simulating a structure has a base with a first elongated side and a second elongated side, the first elongated side being nonadjacent the second elongated side; and an adjustable frame secured to the base. The adjustable frame includes a plurality of girder members secured along the first and second elongated sides to form an arc; a plurality of brackets; a plurality of arms having a latch attached to one end; and a sheet of fabric. The girders are securely fastened along the first elongated side of the base at predetermined intervals; the brackets are secured to the girders; the arms are received by the brackets and adjustably anchored to the girders via a fastener; and the latches engage the sheet of fabric, thus pulling the fabric into a shape that resembles the structure.

15 Claims, 13 Drawing Sheets

(56) References Cited

U.S. PATENT DOCUMENTS

2015/0170548 A1* 6/2015 McClintock ........... G09B 23/32
                                                     434/275
2015/0312530 A1* 10/2015 Karabed ................. B60R 1/081
                                                     348/148
2015/0314583 A1   11/2015 Jess et al.

* cited by examiner

FIG. 12

ADJUSTABLE INTERIOR MOCKUP

RELATED APPLICATION

This application is a continuation-in-part application claiming benefit of U.S. patent application Ser. No. 14/510,020, filed Oct. 8, 2014, the disclosure of which is incorporated herein by reference.

BACKGROUND

The vehicular design industry continually strives to make vehicles lighter and more fuel efficient. The use of composite materials in the design and manufacture process has created a multitude of options in optimizing a vehicle's shape. Vehicular shapes have since become increasingly more complex. Ensuring a sufficient amount of usable space within the vehicle is an important consideration with new vehicle shapes. Both space maximization and passenger comfort are a concern. Of particular interest is aircraft fuselage design.

Currently, reviewing digital mockups of the interior of an aircraft is the dominant method of performing an early evaluation of new aircraft design concepts. Two-dimensional floor plans provide preliminary dimensions for the inside of the aircraft. Three-dimensional models may also be used to get a better idea of how the inside of the aircraft might look, and more accurately show the amount of space that passengers are allotted inside the aircraft. Persons having an expert level of aircraft knowledge are required to read and interpret the plans. It is eventually necessary to have a life-size interior mockup of the aircraft in order for the designers and engineers to make educated decisions regarding spacing of seats, overhead bins, et cetera.

Traditional interior mockups use machined materials to represent interior surfaces of an aircraft to allow designers to make cabin-sized adjustments to proposed interior arrangements before the final aircraft is built. The traditional mockups require significant time to construct and are expensive. Furthermore, once the original mockup has been constructed, tests often identify unanticipated customer comfort aspects. The resulting modifications require an entire new set of machined materials. This re-fabrication adds to the cost and can also delay projects.

SUMMARY

The following presents a simplified summary of the invention in order to provide a basic understanding of some aspects of the invention. This summary is not an extensive overview of the invention. It is not intended to identify critical elements of the invention or to delineate the scope of the invention. Its sole purpose is to present some concepts of the invention in a simplified form as a prelude to the more detailed description that is presented below.

In one embodiment, an adjustable interior mockup is disclosed for simulating a three-dimensional structure. The mockup includes a modifiable structural frame having a plurality of arms adjustably secured thereto, and a flexible panel. The plurality of arms is engageable with the flexible panel to simulate the three-dimensional structure.

In one embodiment, an adjustable interior mockup for simulating a structure has a base, an adjustable frame and a sheet of fabric. The base has a first elongated side and a second elongated side, where the first elongated side is nonadjacent to the second elongated side. The adjustable frame is secured to the base and includes a plurality of girder members secured to the base and a plurality of arms adjustably secured to the girder members.

In another embodiment, an adjustable interior mockup for simulating a structure has a base with a first elongated side and a second elongated side, the first elongated side being nonadjacent the second elongated side; and an adjustable frame secured to the base. The adjustable frame includes a plurality of girder members secured along the first and second elongated sides to form an arc; a plurality of brackets; a plurality of arms having a latch attached to one end; and a sheet of fabric. The girders are securely fastened along the first elongated side of the base at predetermined intervals; the brackets are secured to the girders; the arms are received by the brackets and adjustably anchored to the girders via a fastener; and the latches engage the sheet of fabric, thus pulling the fabric into a shape that resembles the structure.

In still another embodiment, a method for modifying a structural design is disclosed. The method has the following steps: (a) providing an adjustable frame attached to a base, (b) providing a sheet of fabric; (c) determining a first desirable change in the design of the structure; (d) adjusting the length of the arms having latches on the end to simulate the desired changes; (e) determining a second desirable change in the design of the structure; and (f) adjusting the length of the contoured branches to simulate the desired changes. The adjustable frame includes a plurality of girder members secured along the first and second elongated sides to form an arc; a plurality of brackets; a plurality of arms having a latch attached to one end; and a plurality of contoured branches. The girders are securely fastened along the first elongated side of the base at predetermined intervals; the brackets are secured to the girders; and the arms are received by the brackets and adjustably anchored to the girders via a fastener. The latches on the ends of the arms engage the fabric, pulling the fabric into the desired shape, and the contoured branches press against the fabric thereby simulating depressions in the design. The steps for adjusting the length of the arms include: loosening the fastener; moving the arm away from or towards the center of the adjustable frame as desired; and tightening the fastener to secure the arm in place. Position indicators on the arms indicate the length of the arm.

BRIEF DESCRIPTION OF THE DRAWING FIGURES

Illustrative embodiments of the present disclosure are described in detail below with reference to the attached figures.

DETAILED DESCRIPTION

Embodiments of the present invention provide a type of adjustable interior cabin mockup assembly for modeling the actual size and shape of a vehicle. While reference herein is made to the use of an adjustable mockup assembly in aircraft design and manufacture, it shall be understood that the invention may have application in other industries needing a cost-effective and quicker method of creating models of products.

Figure 1:
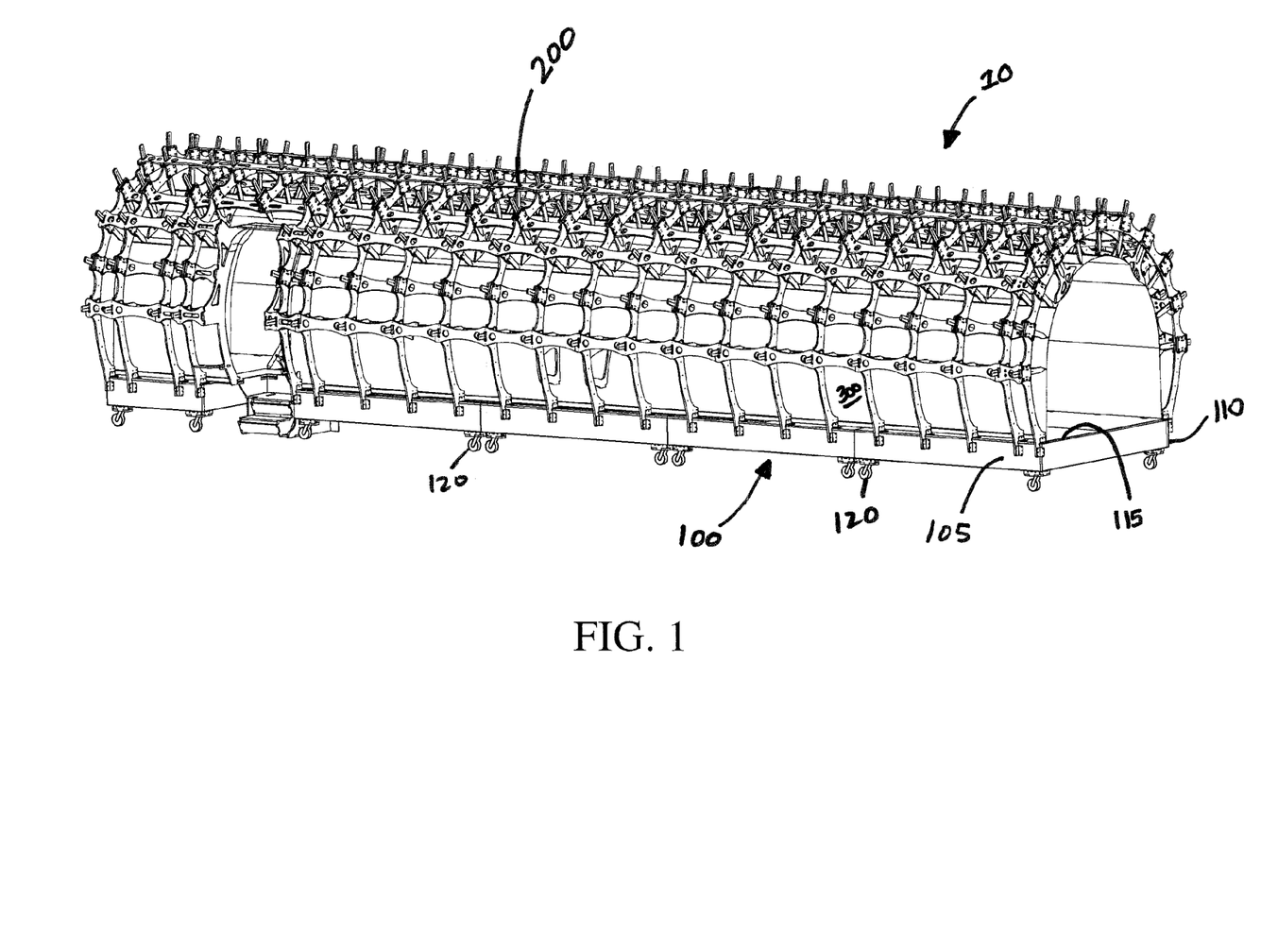
FIG. 1 is a perspective view of an adjustable interior mockup, according to one embodiment.

With reference to FIG. 1, in one embodiment, an adjustable interior mockup assembly 10 includes a base 100, an adjustable frame 200, and a flexible panel 300, which, in an embodiment, is an elastic fabric material. It should be noted that the term "panel" as used herein, unless otherwise specified, may comprise any material that is flexible when acted on by forces and is thus repositionable.

Figure 3:
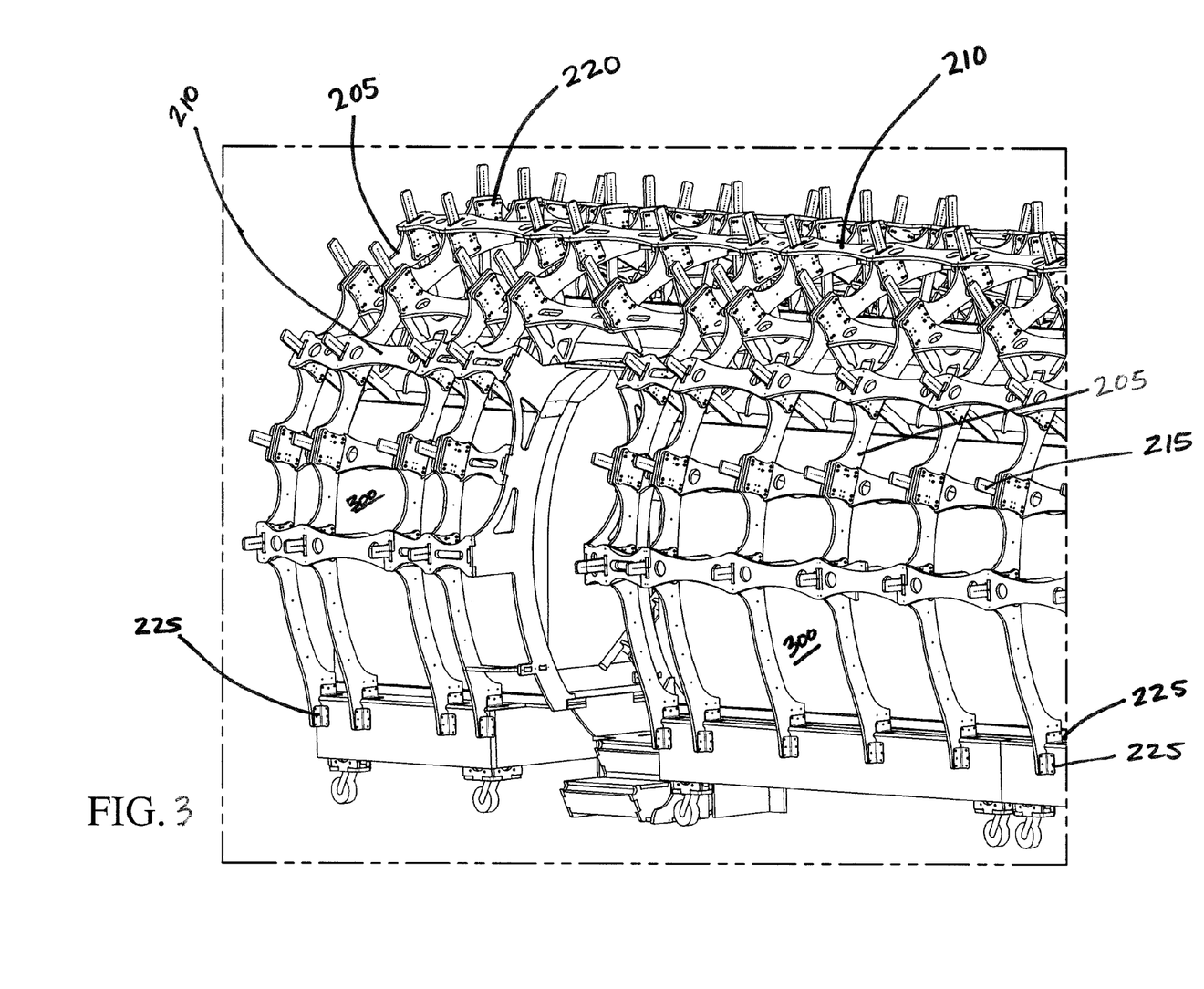
FIG. 3 is another close-up perspective view of the adjustable interior mockup of FIG. 1 showing the frame in greater detail with a representative cutout.

The base 100 may have at least an upper flat surface 115 parallel to the ground. The base 100 supports the weight of the frame 200 as shown in FIGS. 1 and 3. The base may further include a first side surface 105 and a second side surface 110 opposite the first side surface 105 to aid in attaching the frame 200 to the base 100 by receiving fasteners 225. Wheels 120 may be attached to the base 100 for easy transportation of the mockup assembly 10.

As shown in the figures, the adjustable frame 200 is a complex structure for supporting the flexible panel 300 and may include a plurality of longitudinally-spaced, radially extending girders 205 (or frame stations 205), a plurality of laterally-spaced struts 210 (or stringers 210) spanning between and secured to the girders 205, and a plurality of arms 215 outwardly supported by double-sided brackets 220 that flank the girders 205. The arms 215 are held into place via mechanical couplers 230, for example, clamps or vices. The girders 205 serve as the main structural component of the mockup assembly 10. The girders 205 extend upwardly and outwardly from the base 100 and may be shaped to resemble any general structure to be simulated. For example, the girders 205 may be curved to resemble the circular shape of an aircraft cabin, as shown in FIGS. 2-8. Alternately, the girders 205 may take a square shape, or be more oval in shape.

The girders 205 may take a variety of forms to create the shape of the structure. For example, each girder 205 may be formed from a single member that extends from the base's first side 105 to the second side 110. Alternately, the girder 205 may be formed of multiple members extending from either side 105, 110 of the base 100 and spliced together as necessary. The girders 205 may be constructed of any appropriate material, including but not limited to wood, steel, hard plastic, et cetera. Each girder 205 may be fastened to the base 100 using any appropriate method. For example, L-shaped fastening plates 225 (as shown in FIG. 3) may be secured to the girders 205 and the base 100 to hold the girders 205 in place.

Multiple girders 205 may be attached along each of the first and second sides 105, 110 of the base 100 at predefined intervals. The intervals between the girders 205 may depend on the length of the structure and the shape of the structure being replicated. In some embodiments, additional girders 205 may be required on the sides of the base 100 adjacent the first and second sides 105, 110.

Figure 2:
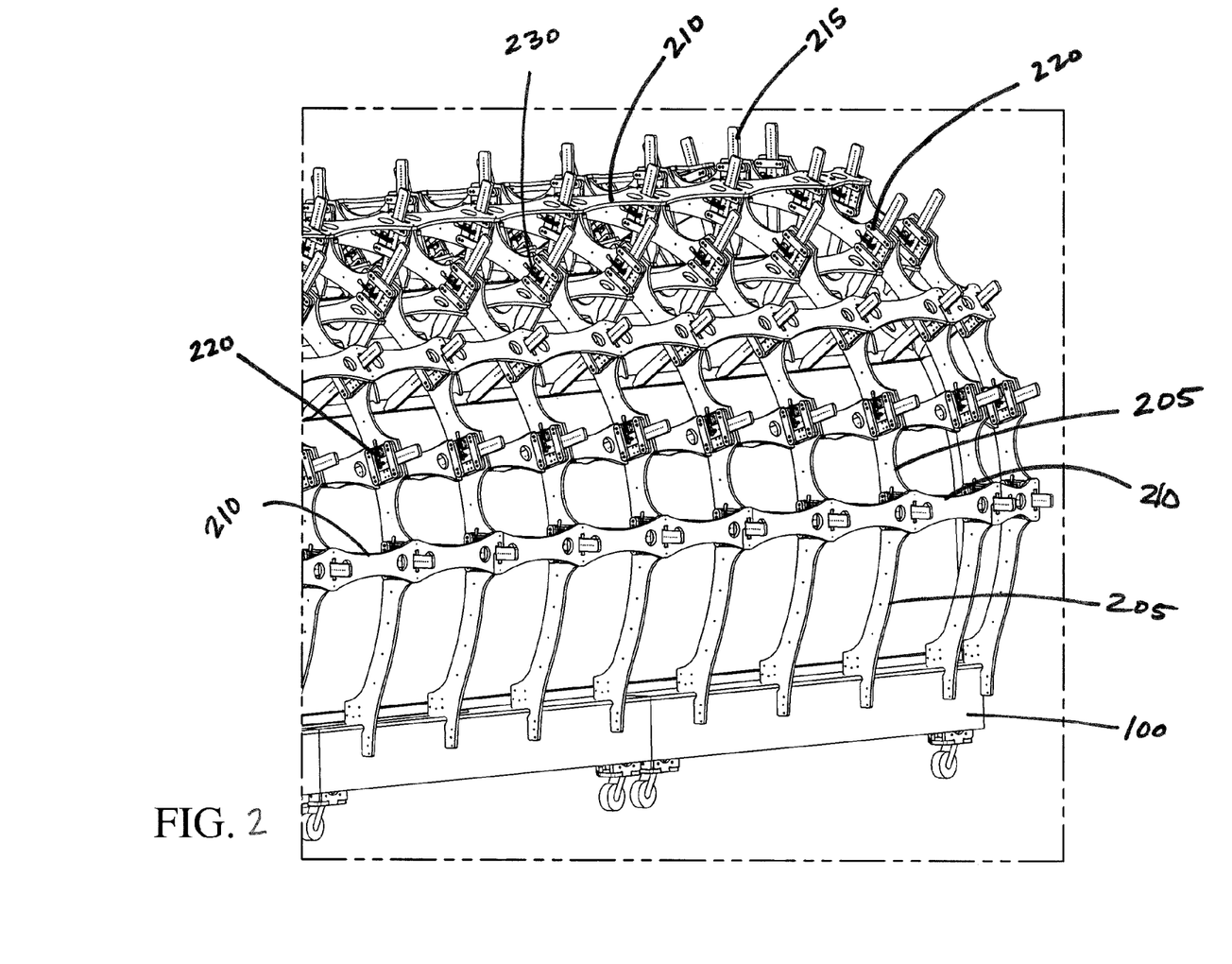
FIG. 2 is a close-up perspective view of the adjustable interior mockup of FIG. 1 showing the frame in greater detail.
Figure 4:
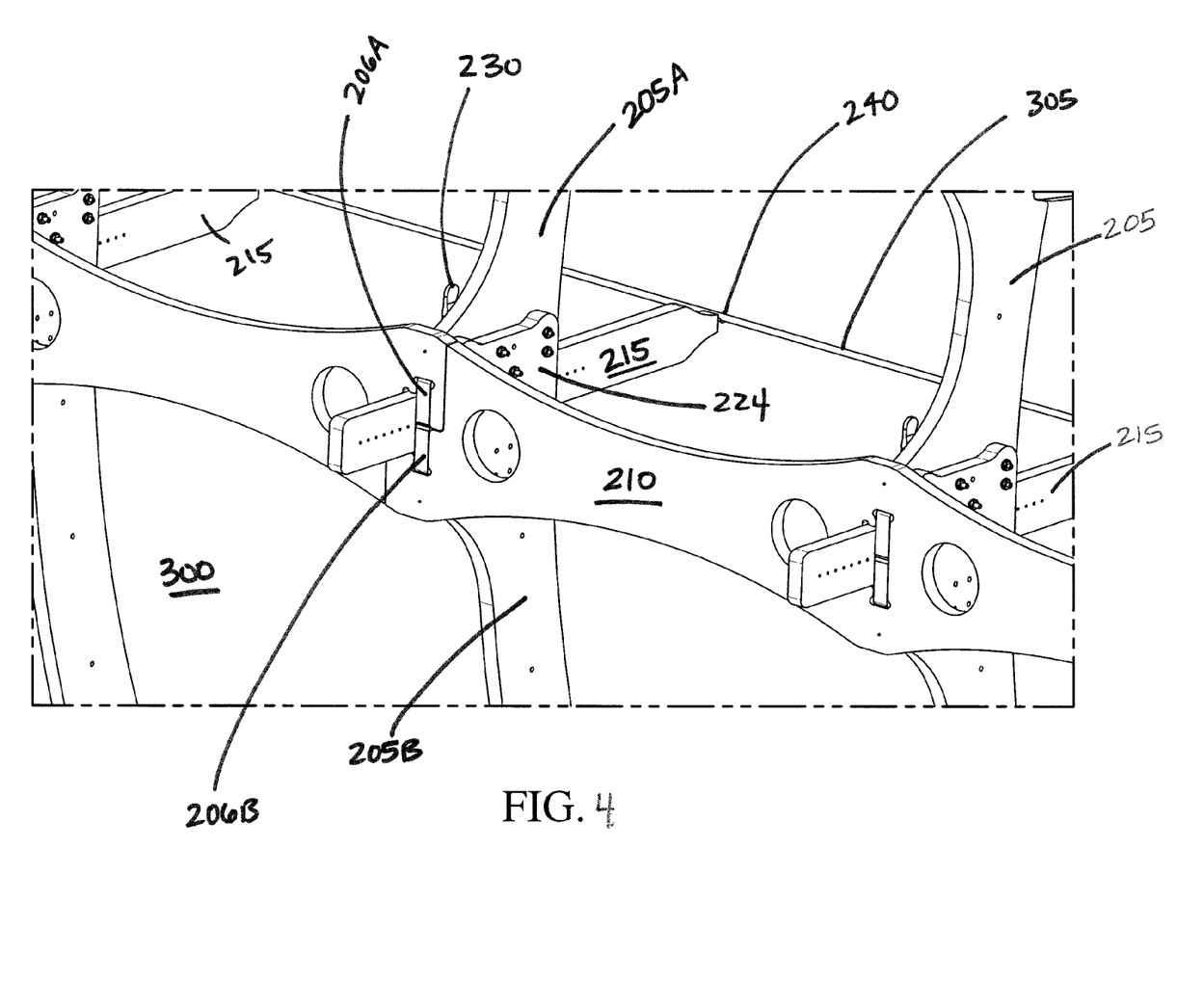
FIG. 4 is another close-up perspective view of the adjustable interior mockup of FIG. 1 showing a strut member.

The frame 200 is further fortified by the strut members 210 that span across the girders 205 lengthwise along the first and second sides 105, 110. As illustrated in FIGS. 2-4, the struts 210 may span across several girders 205 as appropriate. FIG. 4 illustrates how the struts 210 may aid in splicing together multiple girder members 205A, 205B. Outwardly projecting ends 206A, 206B may stick out of the girders 205 and be configured to fit into holes cut into the struts 210 for receiving the ends 206A, 206B. The struts 210 may additionally have cut-outs configured to receive and support arms 215 as shown in FIG. 4. The struts 210 may be generally held into place via the ends 206A, 206B and the arms 215, though the strut 210 may additionally be secured into place using any acceptable fastening means.

Figure 5:
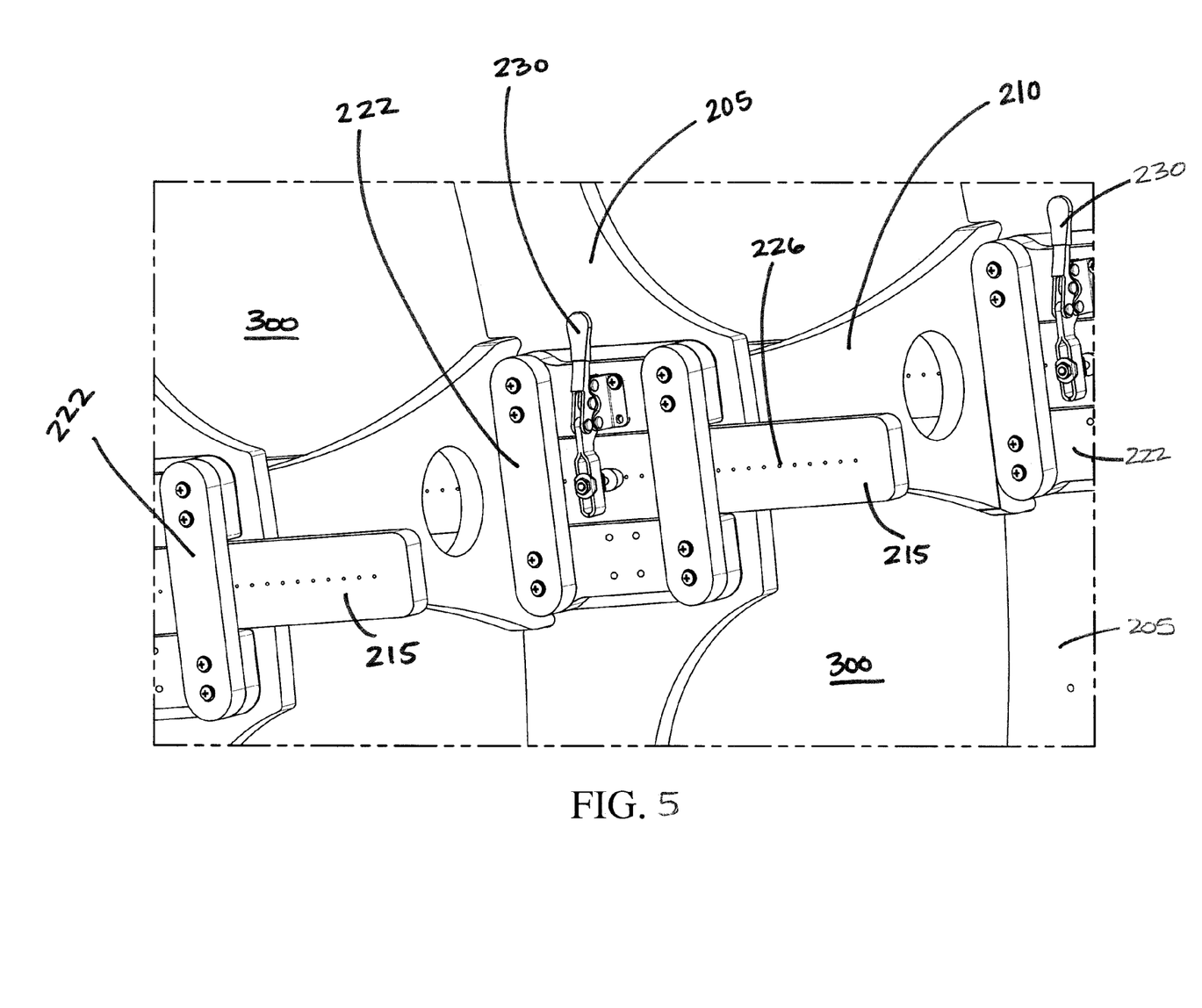
FIG. 5 is yet another close-up perspective view of the adjustable interior mockup of FIG. 1 showing the front face of a bracket and a clamp.
Figure 7:
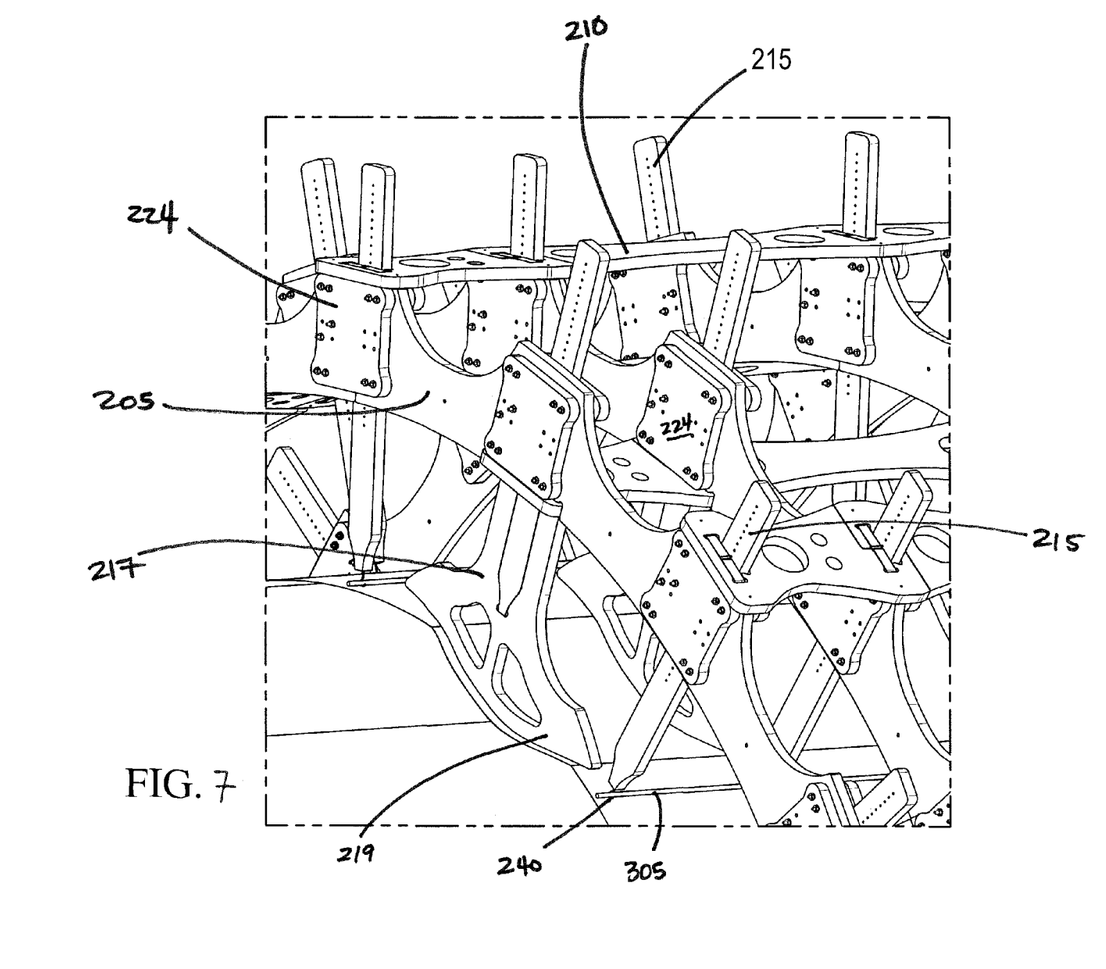
FIG. 7 is still yet another close-up perspective view of the adjustable interior mockup of FIG. 1 showing a contoured branch.
Figure 8:
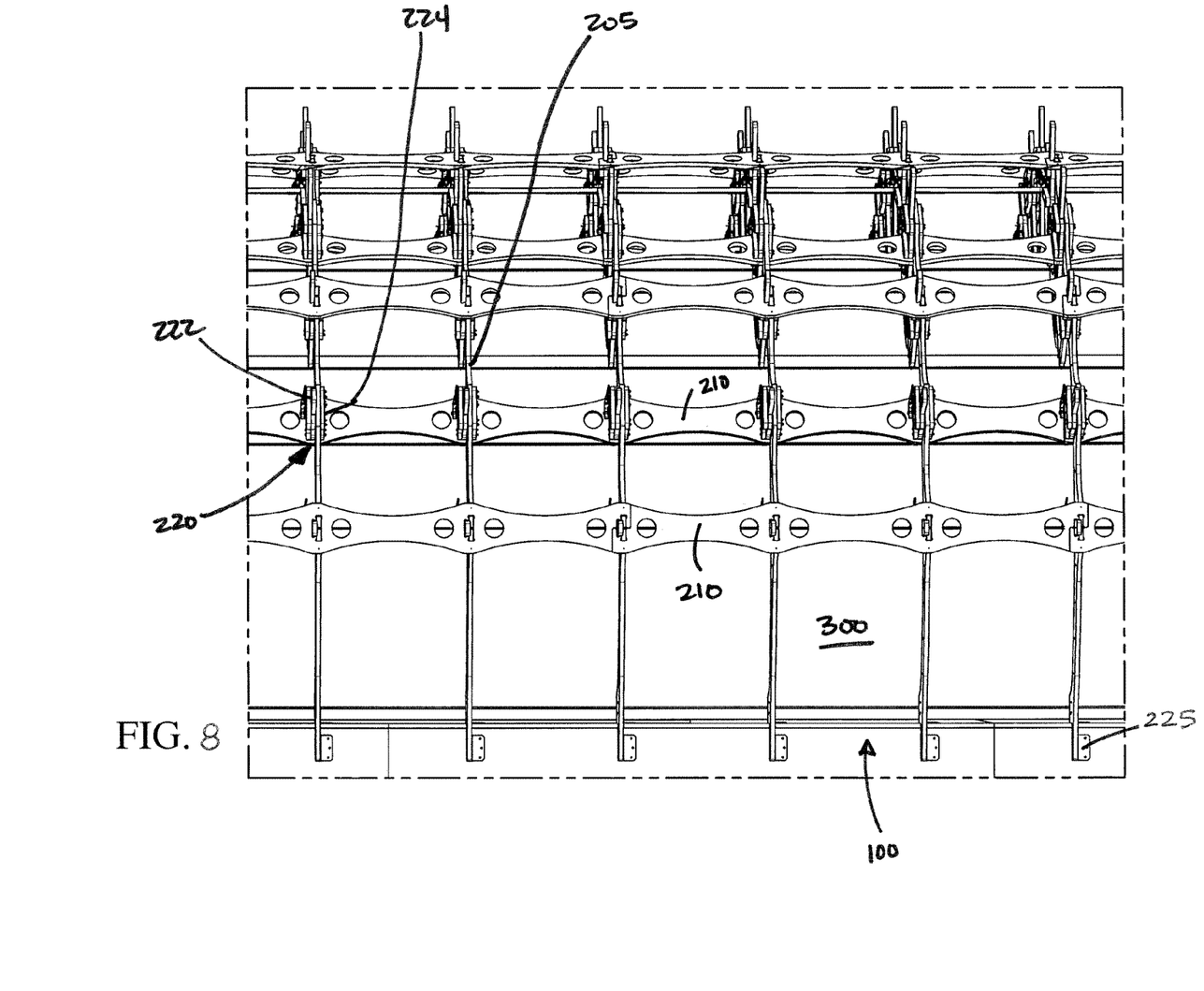
FIG. 8 is a side view of the adjustable interior mockup of FIG. 1.

The arms 215 may be further supported by the double-sided brackets 220 secured to the girders 205. Each bracket 220 may include a front support 222 (as shown in FIG. 5) which receives the arm 215 and a back support 224 (as shown in FIG. 7). The brackets 220 flank the girders 205 such that the front support 222 is secured to one side of the girder 205 and the back support 224 is secured to the opposite side, as illustrated in FIG. 8. A hole in the center of the front support 222 may receive the arm 215, as shown in FIG. 5. The back support 224 may, in addition to the struts 210, aid in splicing together multiple girders 205. However, in certain embodiments where the back support 224 is unnecessary for splicing together multiple girders 205, the bracket 220 may include only a front support 222 secured directly to the girder 205 for supporting the arm 215.

The arm 215 may be held in place via the mechanical coupler 230 such as a clamp, for example. The clamp 230 may be secured to the bracket 220 to hold the arm 215 in the correct position. The length of the arm 215 may be adjusted by releasing the clamp 230 and moving the arm 215 back and forth within the hollowed center of the bracket's front support 222. For ease of reference, the arms 215 may be equipped with position indicators 226 to indicate to the user the position of the clamp 230. It may thus be apparent that a single adjustable frame 200 may be able to simulate several differently sized structures based on the specifications of a particular project. For example, in the aircraft fuselage illustrated in the figures, sliding the arm 215 further through the bracket's front support 222 decreases the size of the mockup fuselage; withdrawing the arm 215 increases the size of the fuselage. It may be appreciated by a person of skill in the art that adjusting the lengths of the arms 215 may be an automated process. Automated embodiments of the adjustable interior mockup assembly 10 are described below in connection with FIGS. 9-12. Such automation may allow for quicker and more accurate placement and adjustment of the arms 215.

Figure 6A:
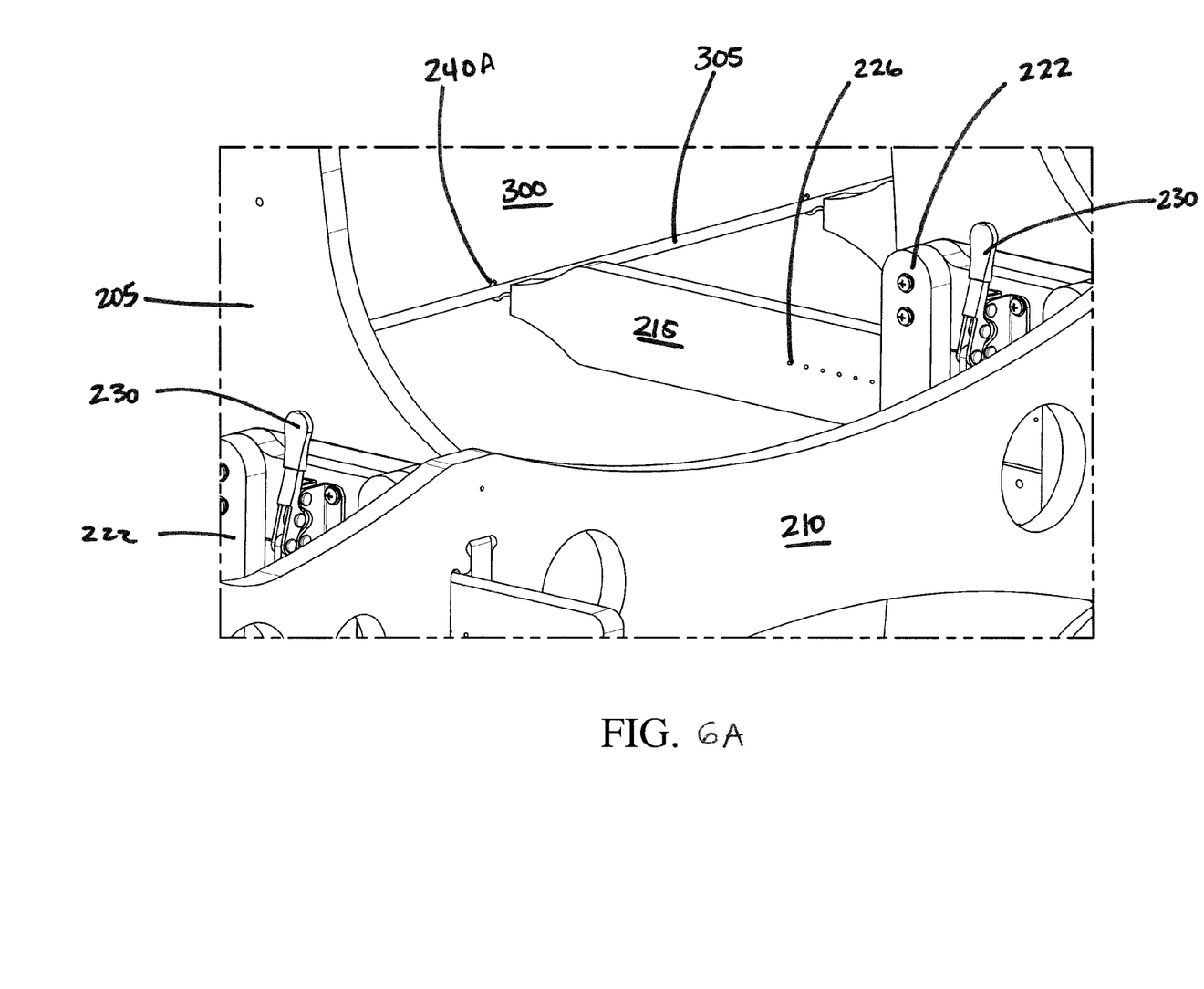
FIG. 6A shows an additional close-up perspective view of the adjustable interior mockup of FIG. 1 showing an arm engaging a rod in an alternate embodiment.
Figure 6B:
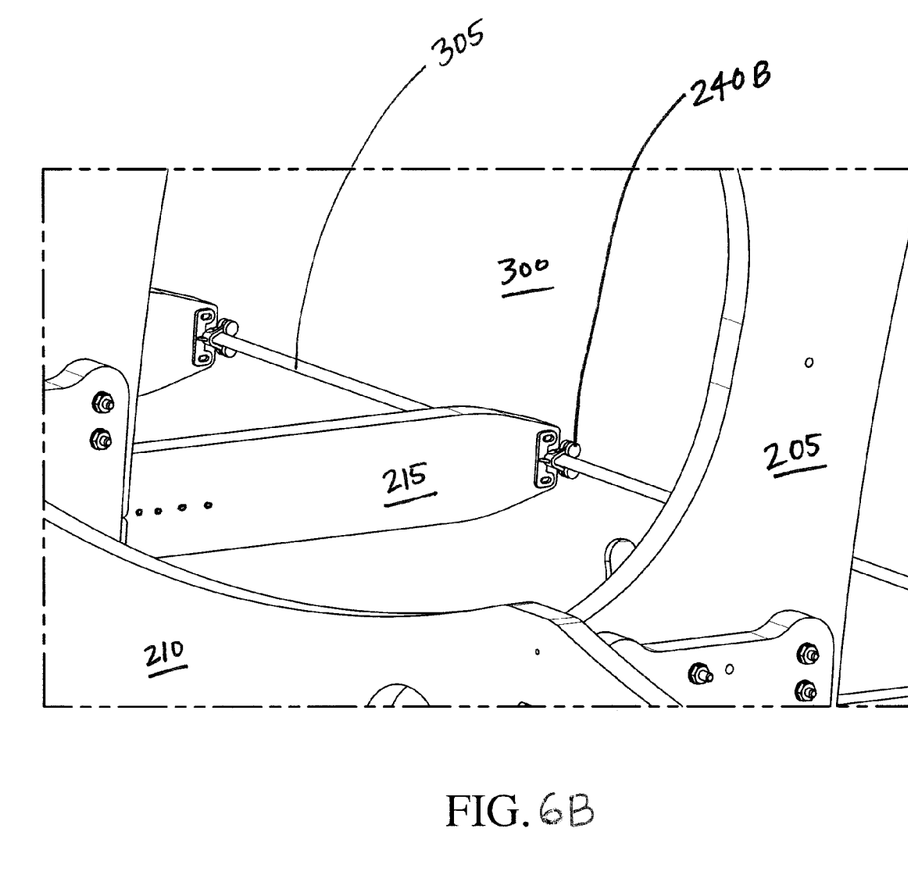
FIG. 6B show additional close-up perspective view of the adjustable interior mockup of FIG. 1 showing an arm engaging a rod in an alternate embodiment.

Although the fuselage may not have a straight shape, the shape of the fuselage can be replicated by varying the lengths of the arms 215 as necessary. It will also be noted that revisions in the structure can be easily accomplished simply by changing the lengths of the arms 215. Each arm 215 may be equipped with a latch 240 on a distal end for grasping the fabric 300. The latch 240 may be, for example, a hook 240A (as shown in FIG. 6A) or a clasp defined by opposing rollers 240B (as shown in FIG. 6B). Laterally spaced rods 305 may be sewn into, or otherwise secured to, the fabric 300. The latch 240 may engage the rods 305, thus pulling the fabric 300 toward the frame 200 to the approximate shape of the structure to be replicated. Thus, together the frame 200 and the fabric 300 provide a physical model of the free space within the simulated structure. Modeling software, such as that provided by CATIA™ modeling software (Dassault Systèmes, France), may be used to develop a template indicating approximately where the rods 305 should be secured to the fabric 300. Alternately, the latches 240 may directly engage the fabric 300 without having rods 305.

The number of brackets 220 and arms 215 required may be determined by shape of the structure to be simulated. For example, as shown in FIG. 1, brackets 220 are secured at intervals around the entire length of the girders 205 to allow the latches 240 to pull the fabric 300 into an arc resembling the shape of an aircraft cabin.

Many types of material 300 may be used to accomplish the flexible panel 300 in the mockup assembly. As noted above, the panel 300 could comprise any material that is flexible when acted on by forces and is thus repositionable. However, it may be realized by those skilled in the art that a fabric 300 having a high elasticity may be preferable so as to accommodate the stretching necessary to create an accurate representation of a structure and to allow for revisions to the design. Additionally, it may be realized that a fabric 300 that allows light to escape through the fabric may be preferable so that the light from the outside of the fabric may be sufficient to light the inside of the mockup.

As shown in FIG. 7, in addition to arms 215 with latches 240, contoured branch 217 may be used to simulate depressions in the structure, such as overhead compartments. The contoured branch 217 may be substantially similar to the arms 215, though the distal end of the contoured branch 217 may be equipped with a shaped end 219 rather than a latch 240. The contoured branch 217 may be secured into the bracket 220 in the same manner as arm 215. This option is available for both the manual embodiments depicted in FIGS. 1-8, as well as the automated embodiments depicted in FIGS. 9-12. While the arms 215 pull the fabric 305 into the desired shape, the shaped end 219 of the contoured branch 217 may press against the fabric 305 to form depressions in the fabric simulating, for example, overhead bins in an aircraft cabin. This may allow designers to quickly ascertain issues in the design and to make changes as necessary.

The mockup may be built to scale to hold furnishings such as aircraft compliant seats and tables. The frame 200 may be further configured to take into account door openings and other structural features. Once the mockup is complete, designers can move throughout the structure and make adjustments as necessary. Revisions in the design of the structure can be easily and inexpensively made.

Figure 9:
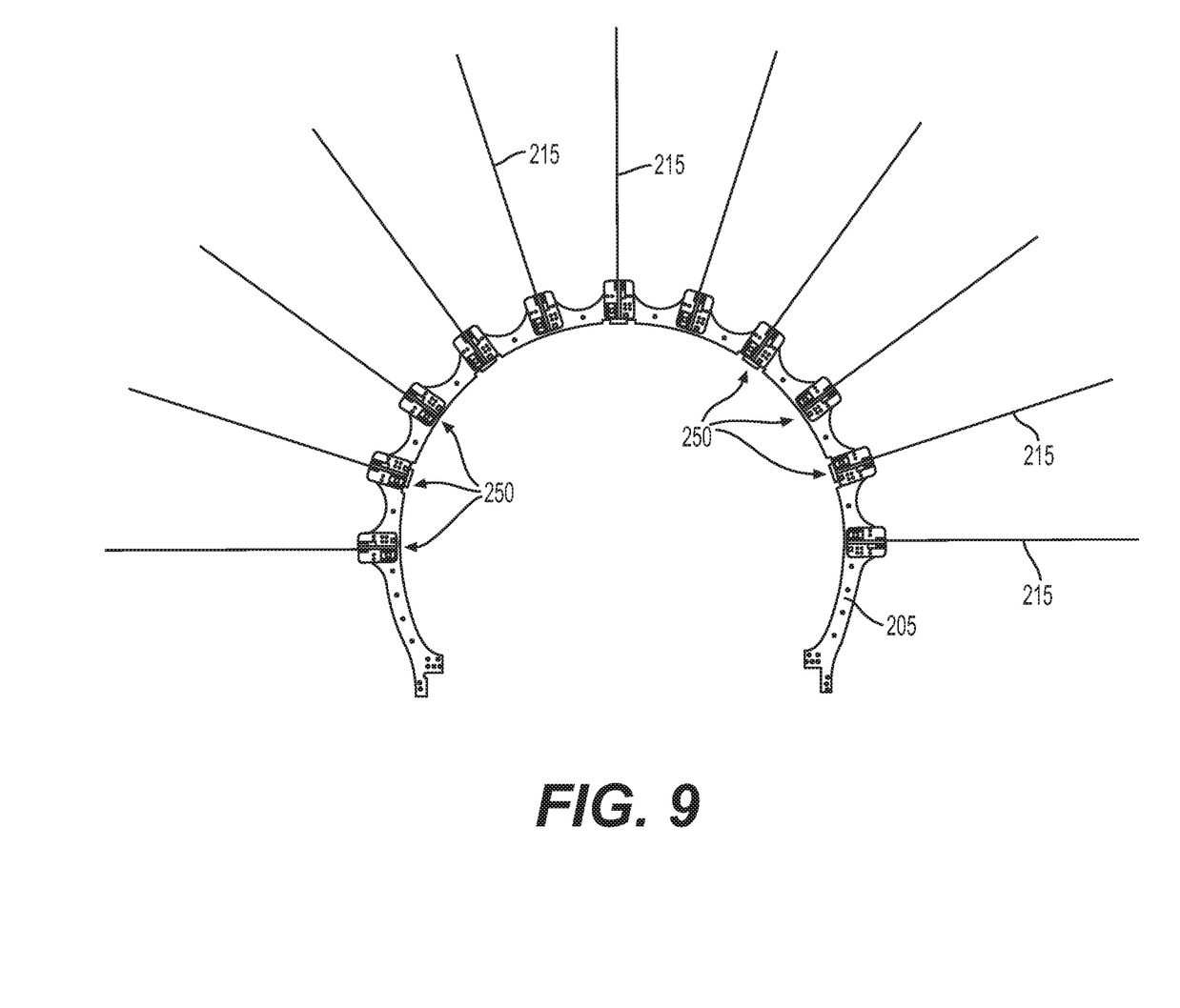
FIG. 9 shows a side view of a single girder equipped with a plurality of motor assemblies as part of an automated embodiment of adjustable interior mockup assembly.
Figure 10:
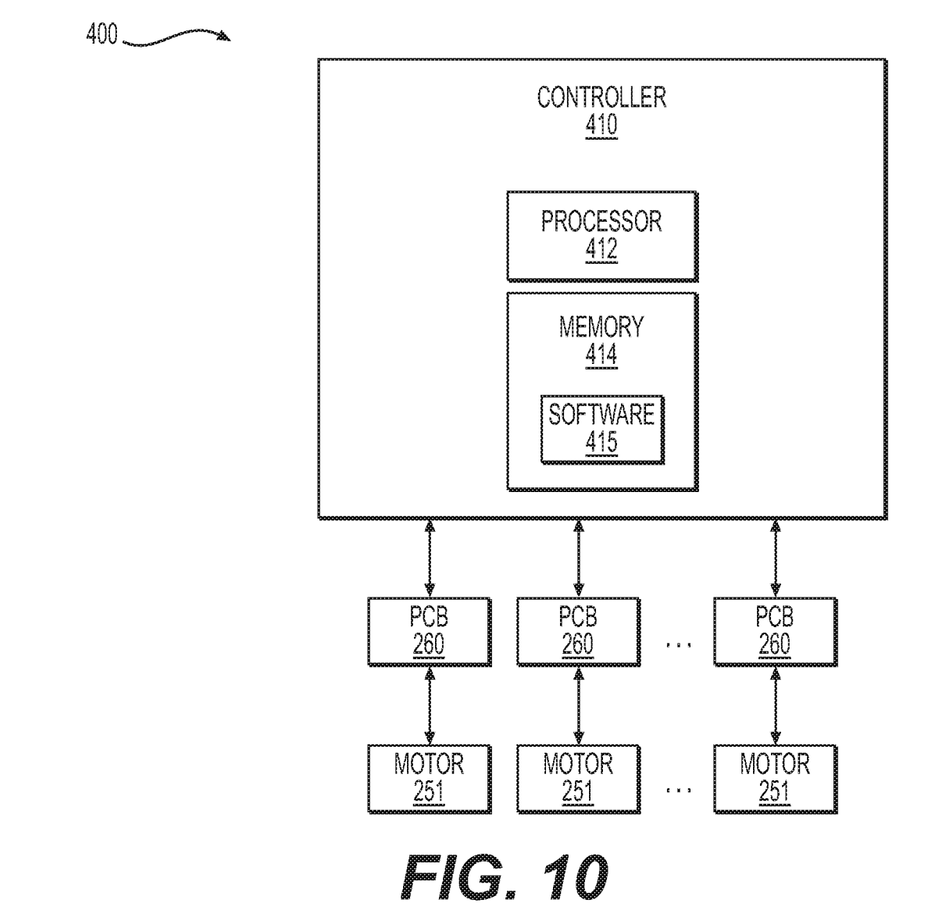
FIG. 10 shows a control architecture for controlling the motor assemblies of FIG. 9, in an embodiment.

FIG. 9 shows a side view of a single girder 205 equipped with a plurality of motor assemblies 250 as part of an automated embodiment of adjustable interior mockup assembly 10. Each of the motor assemblies 250 is adapted for translating a respective one of the plurality of arms 215, as described below in connection with FIGS. 11 and 12. Not all motor assemblies 250 and arms 215 are enumerated in FIG. 9 for clarity of illustration. In certain embodiments, the motor assemblies 250 are adapted to drive each of the arms 215 inwardly and outwardly in a coordinated manner for moving the flexible panel 300 to adjust the size of, and alter the shape of, an interior surface of the mockup. A controller 410, described below in connection with FIG. 10, provides control of each motor assembly and coordinates movement of the plurality of motor assemblies 250. As depicted in FIG. 9, the arms 215 are fully extended outward from girder 205 corresponding to a maximum diameter for an interior surface formed by flexible panel 300. In certain embodiments, the maximum diameter formed by the flexible panel 300 is about 105 inches and a minimum diameter is about 55 inches. However, these diameters are exemplary only and the maximum and minimum diameters may be varied without departing from the scope hereof.

FIG. 10 shows an exemplary control architecture 400 for controlling motor assemblies 250. Control architecture 400 includes a controller 410 communicatively coupled to a plurality of electric motors 251 via a respective one of a plurality of dedicated control boards 260. The dedicated control boards may each be a printed circuit board (PCB), for example. In certain embodiments, controller 410 is configured as a master controller with PCBs 260 configured as slave control boards. Controller 410 is typically a microcontroller, a microprocessor, or programmable logic controller (PLC), but could also be a computer. Controller 410 includes a memory 414, including a non-transitory medium for storing software 415, and a processor 412 for executing instructions of software 415. Memory 414 may be used to store information used by controller 410, including but not limited to algorithms, lookup tables, and computational models. Computational models may include solid models and computer-aided design (CAD) models, for example. In certain embodiments, the computational models are made using CATIA™ modeling software (Dassault Systèmes, France). Some or all of software 415 may be configured as firmware, in some embodiments, for providing low-level control of motors 251. Communication between controller 410 and PCBs 260 may be by one of a wired and/or wireless communication media.

Figure 11:
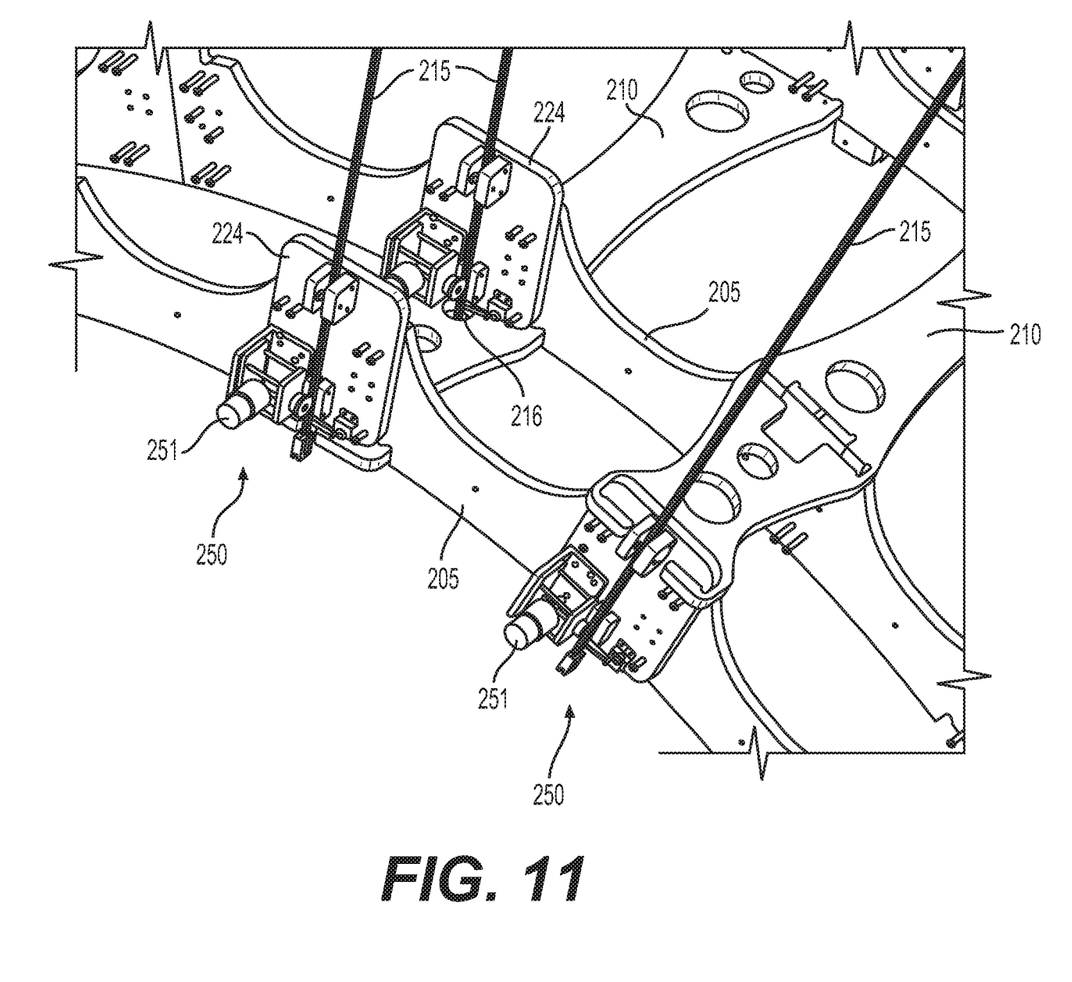
FIG. 11 is a close-up perspective view of the automated embodiment of the adjustable interior mockup showing the motor assemblies of FIG. 9.

FIG. 11 is a close-up perspective view of the automated embodiment of the adjustable interior mockup showing motor assemblies 250 of FIG. 9 in greater detail. Each of the motor assemblies 250 includes an electric motor 251, such as a geared direct current (DC) motor, for driving one of the arms 215. A plurality of struts 210 interconnect the girders 205. For motor assemblies 250 mounted adjacent a strut 210, the strut 210 may be modified to accept a respective one of the arms 215 such that each arm travels unimpeded through a respective strut. For example, strut 210 may include a hole 216 aligned with one of the arms 215, as depicted in FIG. 11. Back support 224 may be used for mounting each motor assembly 250 to girder 205. Front support 222, which is described above in connection with FIGS. 1-8, is not used in the automated embodiment depicted in FIGS. 9-12. Instead, a gear 253 and roller assemblies 255 are used to support the arms 215, as described below in connection with FIG. 12.

Figure 12:
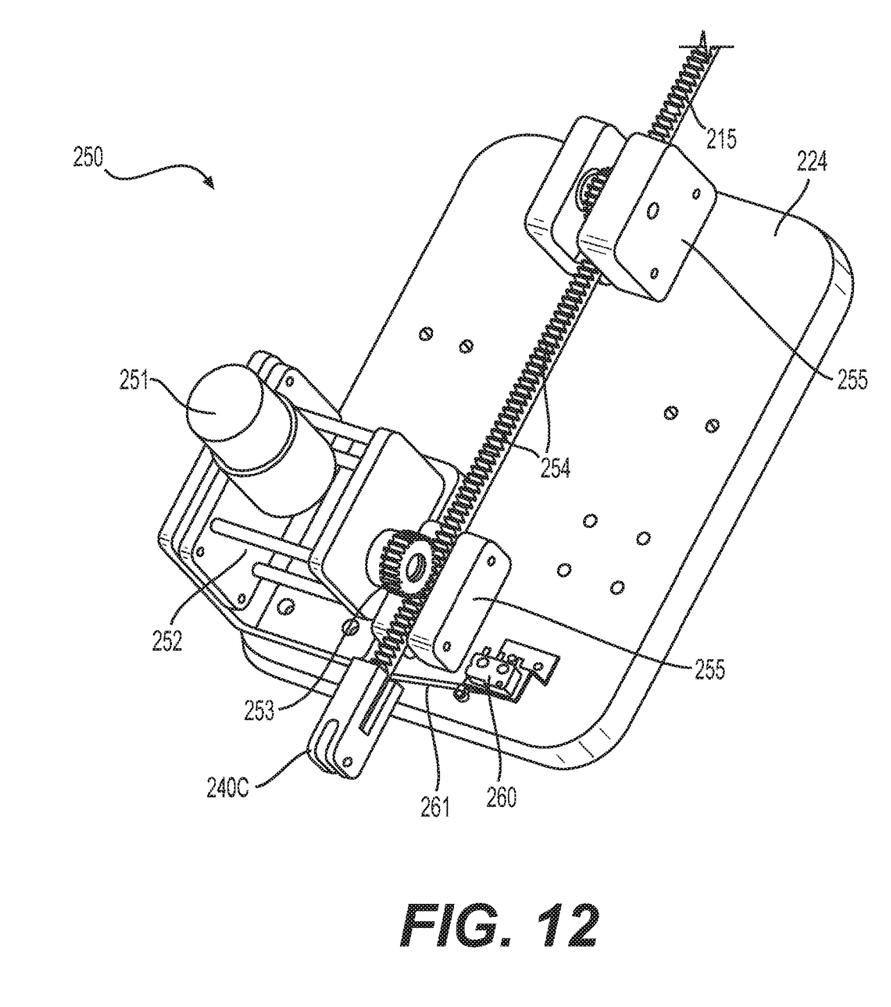
FIG. 12 is a close-up perspective view of a motor assembly from FIG. 9, in an embodiment.

FIG. 12 is a close-up perspective view of one motor assembly 250 of FIGS. 9 and 11. A gearbox 252 mechanically couples with electric motor 251 for rotating gear 253 at a predetermined rate. Arm 215 may include a series of repetitive grooves 254 adapted for meshing with gear 253. In certain embodiments, arm 215 is configured as a rack for meshing with gear 253, and gearbox 252 is a worm gearbox such that arm 215 remains stationary while under load without requiring a separate braking device. Arm 215 is equipped with a latch 240, which may be configured as a hook 240A (FIG. 6A) or a pair of opposing rollers 240B (FIG. 6B). In the embodiment depicted in FIG. 12, the latch is a clip 240C adapted for latching onto one of the laterally spaced rods 305. Clip 240C may be replaced with a shaped end, similar to shaped end 219 of FIG. 7, the shaped end being configured to press against the flexible panel to form depressions in the panel simulating portions of the interior structure.

In operation, an electrical current is applied to motor 251 for rotating gear 253 via gear box 252. As gear 253 rotates, arm 215 is linearly translated via grooves 254. Roller assemblies 255 guide arm 215 for alignment with gear 253. A microswitch 260 may be used for calibrating a maximum position value of arm 215 such that a controller (e.g., controller 410, FIG. 10) prevents motor 251 from exceeding the maximum position value (e.g., an upper limit). Microswitch 260 includes a lever arm 261 for engaging with clip 240C when arm 215 is fully retracted. When microswitch 260 is activated via lever arm 261, a signal is sent to controller 410 for resetting or calibrating the maximum position value for arm 215. Establishing maximum position value is useful in the event of a misalignment caused by a jumped cog of gear 253 or some other cause. With maximum position value established, controller 410 tracks a current position of each arm 215 based on a number of steps of its respective motor 251 (e.g., in embodiments where motor 215 is a stepper motor) or based on a duration of motor 251 turning (e.g., at a constant rate).

The operation of the motors may be performed according to a predetermined sequence to manage and reduce the amount of power needed, which makes the system less expensive and safer. In certain embodiments, each girder 205 includes eleven motor assemblies 250 and girders 205 are grouped together in modules. For example, an end module may include five girders 205 for a total of fifty-five motor assemblies 250, and a middle module may include four girders 205 for a total of forty-four motor assemblies 250. In other words, the modules are subsets of the mockup assembly 10. The modules may be assembled adjacent one another to enable rapid customization of the length of the mockup assembly 10. The controller 410 is used to control the motor assemblies 250 according to the predetermined sequence, which may proceed on a module-by-module basis, for example.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. An automated adjustable interior mockup for simulating a three-dimensional structure, comprising:
   an adjustable frame adapted for supporting a flexible panel of elastic fabric material via a plurality of arms, such that the flexible panel forms an interior surface of a mockup configured to simulate a three-dimensional structure;
   wherein each of the plurality of arms comprises:
      an inner end having either:
         a) a latch adapted for grasping the flexible panel of elastic fabric material; or
         b) a shaped end adapted for pressing the flexible panel of elastic fabric material;
   a plurality of motors mounted onto the adjustable frame, each of the plurality of motors adapted to translate a respective one of the plurality of arms inwardly or outwardly;
   a controller having a non-transitory memory for storing software and a processor for executing instructions of the software, the controller being communicatively coupled with each of the plurality of motors, wherein the software includes instructions for automatically translating each of the plurality of arms outwardly or inwardly to a predetermined position, thereby adjusting an interior configuration of the mockup;
   wherein when arm of the plurality of arms having the latch is translated outwardly, the flexible panel is pulled via the arm's respective latch, thereby manipulating the interior shape of the mockup; and
   wherein when arm of the plurality of arms having the shaped end is translated inwardly, the flexible panel is pressed to form a shape according to the shaped end of the respective arm, thereby manipulating the interior shape of the mockup.

2. The automated adjustable interior mockup of claim 1, wherein the adjustable frame includes a plurality of girders for supporting the plurality of motors, and a plurality of struts for interconnecting the plurality of girders.

3. The automated adjustable interior mockup of claim 2, wherein the adjustable frame includes one or more modules comprising a subset of the plurality of girders, wherein the controller provides coordinated control of the plurality of motors within each module.

4. The automated adjustable interior mockup of claim 1, each of the plurality of motors having a gear adapted to mesh with a series of repetitive grooves in each respective arm, thereby translating the arm as the motor turns the gear.

5. The automated adjustable interior mockup of claim 1, a microswitch adapted to determine a maximum position value of an arm to prevent a corresponding motor from overshooting the maximum position value.

6. The automated adjustable interior mockup of claim 5, wherein the controller determines a current position of each of the plurality of arms based on a respective maximum position value.

7. The automated adjustable interior mockup of claim 1, wherein the shaped end is configured to be pressed into an outside surface of the flexible panel to form interior protrusions in the flexible panel that simulate a portion of an aircraft interior design.

8. The automated adjustable interior mockup of claim 1, further comprising a rod sewn into the flexible panel of elastic fabric material, wherein the rod is configured to be grasped by the latch of an arm of the plurality of arms, wherein the rod forms a physical feature in the interior surface of the mockup that is adjustable outwardly or inwardly via at least one of the plurality of motors.

9. An automated method for simulating a three-dimensional structure using an adjustable interior mockup, comprising:

providing an adjustable frame adapted for supporting a flexible panel of elastic fabric material via a plurality of arms;

providing a plurality of latches, each of the plurality of latches mechanically coupled to a first end of one of the plurality of arms;

grasping, with the plurality of latches, the flexible panel such that the flexible panel forms an interior surface of the mockup;

translating the plurality of arms, using a respective plurality of motors, to respective first positions, each of the plurality of motors being mounted onto the adjustable frame, thereby forming a first interior configuration of the mockup; and automatically adjusting the interior configuration of the mockup using a controller, the controller having a non-transitory memory for storing software and a processor for executing instructions of the software, the controller being communicatively coupled with each of the plurality of motors, wherein the software includes instructions for automatically translating each of the plurality of arms to a second position, thereby readily forming a second interior configuration of the mockup.

10. The automated method of claim 9, further comprising coordinating, using the controller, translation of the plurality of arms via the plurality of motors based on one or more modules within the adjustable frame.

11. The automated method of claim 9, further comprising determining, using the controller, a maximum position value of an arm using a microswitch to prevent a corresponding motor from overshooting the maximum position value.

12. The automated method of claim 11, wherein determining, using the controller, a current position of each of the plurality of arms is based on a respective maximum position value.

13. The automated method of claim 9, translating a shaped end attached to an inside end of at least one of the plurality of arms via a respective motor, thereby pressing the shaped end into an outside surface of the flexible panel for forming interior protrusions in the flexible panel that simulate a portion of an aircraft interior design.

14. The automated method of claim 9, further comprising providing a computer-aided design (CAD) model of the adjustable interior mockup, and automatically adjusting the interior configuration of the mockup based on the computer-aided design (CAD) model.

15. An automated adjustable interior mockup for simulating a three-dimensional structure, comprising: an adjustable frame adapted for supporting a flexible panel of elastic fabric material via a plurality of arms, such that the flexible panel forms an interior surface of a mockup configured to simulate a three-dimensional structure; wherein each of the plurality of arms comprises an inner end having either a latch adapted for grasping the flexible panel or a shaped end adapted for pressing the flexible panel; a plurality of motors mounted onto the adjustable frame, each of the plurality of motors adapted to translate a respective one of the plurality of arms inwardly or outwardly for pushing or pulling the flexible panel, respectively; wherein when an arm of the plurality of arms having the latch is translated outwardly, the flexible panel is pulled via the arm's respectively latch, thereby manipulating the interior surface of the mockup; and wherein when an arm of the plurality of the mockup; a controller having a non-transitory memory for storing software and a processor for executing instructions of the software, the controller being communicatively coupled with each of the plurality of motors, wherein the software includes instructions for translating each of the plurality of arms outwardly or inwardly to a predetermined position, thereby readily adjusting an interior configuration of the mockup; and a computer model of a three-dimensional structure to be simulated, wherein the instructions are used to automatically translate each of the plurality of arms outwardly or inwardly according to the computer model.

\* \* \* \* \*